Feb. 21, 1928.

N. M. BAKER

LENS GAUGE

Filed April 21. 1926

1,659,969

Inventor
Nelson M. Baker.
By Harry H. Styll.
Attorney

Patented Feb. 21, 1928.

1,659,969

UNITED STATES PATENT OFFICE.

NELSON M. BAKER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS GAUGE.

Application filed April 21, 1926. Serial No. 103,626.

This invention relates to plunger dial gauges and has particular reference to means for preventing grit and dirt getting into the gauge around the plunger.

The object of this invention is to provide improved means to prevent dirt and grit entering the gauge around the orifice through which the plunger passes.

Other objects and advantages of the invention will become apparent from the following description taken in connection with the accompanying drawings, and it will be apparent that many changes and modifications may be made in the details of construction and arrangement of parts without departing from the spirit of the invention within the scope of the appended claim. The preferred form only of the invention has been shown by way of illustration.

Referring to the drawings in which similar characters of reference are used to denote corresponding parts throughout:

Figure 1:
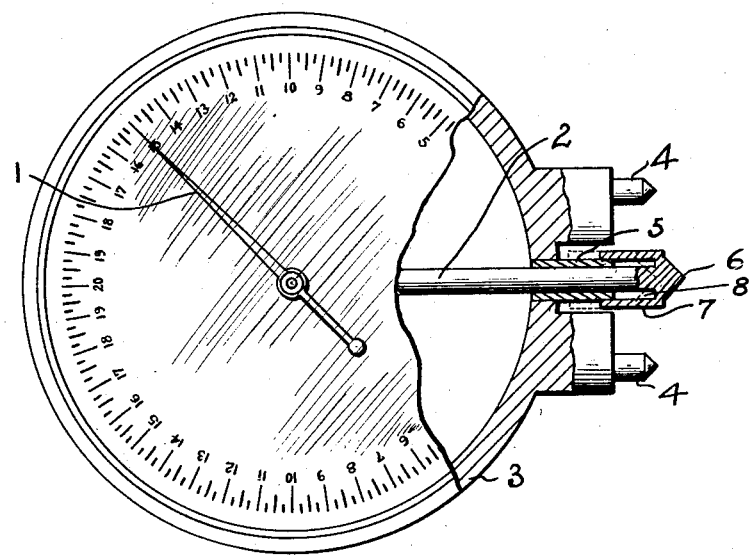
Figure 1 is a top or plan view partially in section.
Figure 2:
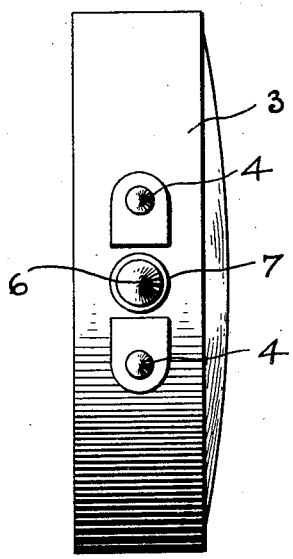
Figure 2 is an end or side view of Figure 1 showing the location of the plunger.

In many forms of dial gauges the dial hand 1 is operated by a reciprocating plunger or pin 2 passing through an orifice in the walls of the dial case 3. In addition to the plunger 2 there are two stationary or fixed pins 4. The plunger 2 reciprocates back and forth through the opening in the dial casing 3 and it has been found from experience that dirt, grit and oil are liable to work their way into the dial case through the opening therein around the plunger 2. To provide means to prevent this foreign matter from getting into the dial case I insert a liner or sleeve 5 in the opening in the dial case 3, this sleeve extending some distance beyond the dial case. I also provide a contact head 6 for the plunger 2 having a boss 7 which is recessed at 8 to fit over the sleeve 5. It will, therefore, be seen that the boss 7 fitting over the sleeve 5 will prevent the dirt from coming in contact with the plunger 2 and even if some foreign matter should get into the opening 8 it would be prevented from getting into the casing 3 by the sleeve 5.

In operation it will be seen that as the plunger 2 is reciprocated the boss 7 can reciprocate back and forth over the sleeve 5, the orifice 8 being long enough to allow for the total reciprocation of the plunger 2.

From the foregoing description it will be seen that I have provided simple, inexpensive and efficient means for carrying out all the objects of the invention.

Having described my invention, I claim:

In a gauge for measuring variations in distance from the center of the gauge to various points of a measured surface, a casing, a rotatable indicator, a reciprocal plunger in the casing and extending therebeyond, a sleeve bearing in the casing surrounding the plunger and wherein the plunger may reciprocate and extending beyond the casing, a pair of separated stationary contact points on the casing and extending therebeyond one on each side of the plunger, said plunger having a contact point intermediate the stationary contact points, and an annular sleeve bearing surrounding the first sleeve bearing adapted to reciprocate thereon as the plunger is reciprocated, said annular sleeve being in engagement with the first sleeve for all positions of the plunger during its reciprocation.

NELSON M. BAKER.